P. L. ROOKLEDGE.
AUTOMOBILE SPRING.
APPLICATION FILED NOV. 12, 1917.
1,279,916.
Patented Sept. 24, 1918.
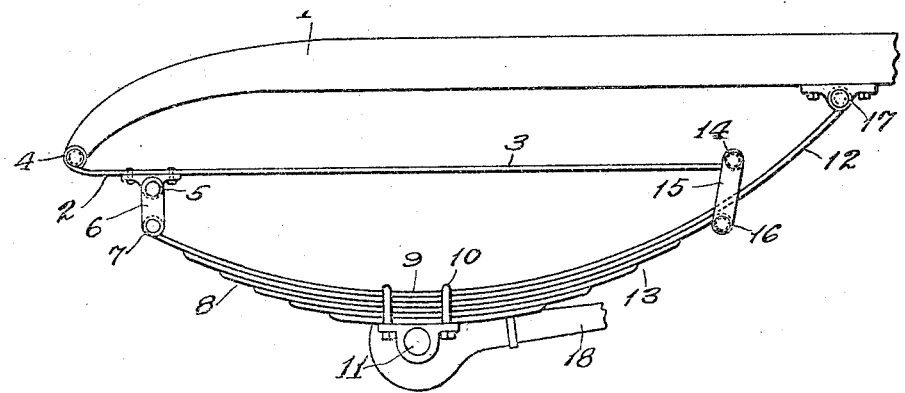
Witness
C. C. Holly
Inventor
Percival L. Rookledge
by James R. Townsend
his atty.

UNITED STATES PATENT OFFICE.

PERCIVAL L. ROOKLEDGE, OF HOLLISTER, CALIFORNIA.

AUTOMOBILE-SPRING.

1,279,916.    Specification of Letters Patent.    Patented Sept. 24, 1918.

Application filed November 12, 1917. Serial No. 201,698.

*To all whom it may concern:*

Be it known that I, PERCIVAL L. ROOKLEDGE, a citizen of the United States, residing at Hollister, in the county of San Benito and State of California, have invented a new and useful Improvement in Automobile-Springs, of which the following is a specification.

This invention is adapted to form a resilient interposition between the rear axle and the chassis of an automobile. Said rear axle and chassis are in ordinary practice held against longitudinal displacement, but are adapted to move toward and from each other in the ordinary travel of the vehicle.

This invention relates to an improvement of the vehicle spring set forth in Letters-Patent of the United States patented to myself and to G. W. Gillespie, Nov. 19, 1912, #1,044,692, in which a lever spring having an elongate limber limb and relatively short rigid limb is employed as an intermediate resilient means between other spring means and a load-carrying or shock-transmitting device for which the spring is constructed.

An object of this invention is to provide a spring having maximum resilient and load-bearing qualities combined with the frame of the car and the supporting axle.

Other objects and advantages may appear from the accompanying drawings, the subjoined detail description and the appended claims.

The accompanying drawing illustrates the invention.

1 indicates a fragment of the chassis or frame of the car. 2 indicates the relatively short rigid arm and 3 the elongate limber arm of the lever spring. The lever spring formed of arms 2, 3, is hinged at 4 to the end of the frame, and swings toward and from the frame. 4 is a fulcrum between lever spring 2, 3, and the rear of the frame 1. 5, 6, 7 indicate the fulcrum joints and link connection between the lever spring and one limb 8 of a stubborn swinging spring 9 that is secured by clip 10 to the axle 11, and is hinged at the tip 12 of the second limb 13 of the stubborn swinging spring to the frame 1. The tip of the elongate limber arm 3 of the lever spring is connected by joint 14 to a rigid link 15 that is connected by a joint 16 to the hinged limb 13 of the stubborn spring. The tip 12 of the limb 13 is hinged directly by a joint 17 with the frame 1.

A shock upon the axle 11 between the hinged limb 13 and swinging limb 8 of the stubborn spring 9 is transmitted through the stubborn resilient limbs 8, 13, to the swinging rigid links 6, 15, and thereupon the elongate limber arm 3 of the lever will bow toward the frame, and with sufficient increase of load, will finally bump thereupon as explained in said patent.

It is understood that the axle 11 and the frame 1 are held by the usual reach 18 from endwise displacement relative to the movement of the frame 1 and the movement of the axle 11 and its spring 9 is only toward and from the frame. The lever spring in this construction is not movable lengthwise of the frame 1, being hingedly connected at 4 thereto. The axle spring 8, 9, 12, 13, is held by the hinge joint 17 against longitudinal movement relative to the frame 1. The connections 14, 15, 16 provide for relative longitudinal or other displacement of the axle spring that is hinged at 17 to the frame 1, and the lever spring 2, 3, 5, thus giving perfect freedom of action to the more or less resilient limbs or arms of the spring elements above enumerated.

I claim:—

1. The combination with a frame and an axle, of a lever spring having relatively short and rigid and relatively long and limber arms hinged by the rigid arm to the frame to allow the lever spring to swing toward and from the frame; a relatively stubborn spring having resilient limbs and fixed to the axle between said resilient limbs; said stubborn spring being hinged to said frame by the tip of the limb; a rigid link pivoted at one end to the second end of said stubborn spring and pivoted at its other end to a fulcrum between the short rigid, and elongate limber ends of the lever spring; and a rigid link pivoted at one end to the tip of the limber limb and at the other end to the hinged limb of the stubborn spring.

2. The combination with a frame, of a stubborn spring having a resilient tip hinged to the frame; a lever spring hinged to the frame and having an elongate limber limb interposed between the stubborn spring and the frame; a rigid link fulcruming the lever spring to a resilient tip of the stubborn spring, and a rigid link connecting the end of the elongate limber limb with the stubborn spring.

In testimony whereof, I have hereunto set my hand at Hollister, California, this 5th day of November, 1917.

PERCIVAL L. ROOKLEDGE.

Witness:
JAMES R. TOWNSEND.

Copies of this patent may be obtained for five cents each, by addressing the "Commissioner of Patents, Washington, D. C."